US012511287B1

(12) United States Patent
Das et al.

(10) Patent No.: US 12,511,287 B1
(45) Date of Patent: Dec. 30, 2025

(54) METHOD AND SYSTEM FOR CONTEXT AUGMENTATION IN RETRIEVAL AUGMENTED GENERATION

(71) Applicant: Accenture Global Solutions Limited, Dublin (IE)

(72) Inventors: Sankar Narayan Das, Barrackpore (IN); Kuntal Dey, Rampurhat (IN); Anuj Gupta, Ambala (IN); Amal Jose, Idukki (IN); Srushti Ajay Gajbhiye, Nagpur (IN); Swaminathan Gopalakrishnan, Pune (IN); Sharath Haikadi Vasudeva Achar, Bangalore (IN); Raman Gupta, Holliston, MA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/960,127

(22) Filed: Nov. 26, 2024

(51) Int. Cl.
  *G06F 16/24* (2019.01)
  *G06F 16/2453* (2019.01)
  *G06F 16/22* (2019.01)

(52) U.S. Cl.
  CPC .... *G06F 16/24535* (2019.01); *G06F 16/2272* (2019.01)

(58) Field of Classification Search
  CPC .............. G06F 16/24535; G06F 16/2272
  See application file for complete search history.

(56) References Cited

U.S. PATENT DOCUMENTS 10,701,125 B2 * 6/2020 Lee .................. H04L 65/80
2025/0272507 A1 * 8/2025 Dar .................. G06F 40/40

OTHER PUBLICATIONS

Anantha, et al., "Context Tuning for Retrieval Augmented Generation," arXiv:2312.05708vi [cs.IR] Dec. 9, 2023, 9 pages.
Li, Zhuowan, et al., "Retrieval Augmented Generation or Long-Context LLMs? A Comprehensive Study and Hybrid Approach," arXiv:2407.16833v2 [cs. CL] Oct. 17, 2024, 13 pages.
Singh, Samar, "Mastering RAG: Advanced Methods to Enhance Retrieval-Augmented Generation," Medium, Jun. 17, 2024, 20 pages. [retrieved from the Internet Nov. 26, 2024—https://medium.cm/@samarrana407/mastering-rag-advanced-methods-to-enhance-retrieval-augmented-generation-4b611f6ca99a].

* cited by examiner

*Primary Examiner* — Loc Tran
(74) *Attorney, Agent, or Firm* — Mannava & Kang, P.C.

(57) ABSTRACT

The present disclosure recites methods and systems for context augmentation. The method includes generating, in accordance with a policy of a RAG system, a first set of queries for a chunk of a plurality of chunks, the plurality of chunks represents a context of the RAG system. Further, the method includes determining, based upon a set of quality indicators, a quality class of each query of the first set of queries. Thereafter, the method includes, updating, the chunk to an updated chunk to further include query data of one or more queries of the first set of queries based upon the quality class of the each query of the first set of queries. Further, the method includes storing, the updated chunk in a database as a vector for retrieval from the RAG system upon receiving a prompt.

17 Claims, 5 Drawing Sheets

METHOD AND SYSTEM FOR CONTEXT AUGMENTATION IN RETRIEVAL AUGMENTED GENERATION

TECHNICAL FIELD

Various examples described herein relate generally to context augmentation. Specifically, disclosed examples are directed to a method and a system for augmentation of context for retrieval augmented generation (RAG) based on a large language model (LLM).

BACKGROUND

Retrieval Augmented Generation (RAG) enhances the capabilities of a large language model by incorporating external knowledge sources. While large language models are trained on massive datasets, RAG systems augment their responses by referencing authoritative information beyond their original training data. This process involves retrieving relevant information from a knowledge base and integrating it into the model's generation process, leading to more accurate and informative outputs. However, RAG systems face a limitation in that they often require all necessary information to be explicitly stated in the query. This can be problematic when using semantic search, a common tool retrieval method, as it may struggle to retrieve relevant information if the query is incomplete or lacks sufficient context.

SUMMARY

Implementations of the present disclosure are generally directed to context augmentation. More particularly, implementations of the present disclosure are directed to methods and systems for augmentation of context for retrieval augmented generation (RAG) based on a large language model (LLM).

In general, innovative aspects of the subject matter described herein provide a method and a system for context augmentation. The method may include generating, in accordance with a policy of a RAG system, a first set of queries for a chunk of a plurality of chunks, the plurality of chunks represents a context of the RAG system. Further, the method may include determining, based upon a set of quality indicators, a quality class of each query of the first set of queries. Thereafter, the method may include, updating, the chunk to an updated chunk to further include query data of one or more queries of the first set of queries based upon the quality class of the each query of the first set of queries. The method may also include storing, the updated chunk in a database as a vector for retrieval from the RAG system upon receiving a prompt.

The present disclosure further describes a system for implementing the method provided herein. The present disclosure also describes non-transitory computer-readable media (CRM) coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DRAWINGS

Various examples in accordance with the present disclosure will be described with reference to the drawings, in which.

Like reference numbers and designations in the various drawings indicate like elements.

DETAILED DESCRIPTION

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring details of the examples.

The specification and drawings are to be regarded in an illustrative rather than a restrictive sense. It will, however, be evident that various modifications and changes may be made thereunto without departing from the broader spirit and scope of the invention as set forth in the claims.

Use of large language models (LLMs) is increasing because of their astounding capabilities of completing Natural Language Processing (NLP) tasks, such as summarization and question-answering. In the conventional methodologies, LLMs, irrespective of their NLP capabilities, frequently encounter challenges to generate appropriate responses when new and up-to-date data is processed. Further, hallucination is another limitation in the conventional methods of utilization of LLMs. Retrieval Augmented Generation (RAG) system allows LLMs to access up-to-date information and sensitive data. Also, RAG system reduces hallucination of LLMs. A RAG system disclosed herein primarily comprises of three sub-processes: chunking of documents/data and storing the chunks within a vector store, retrieving appropriate chunks as context based on the user-queries, and using a LLM to generate a response based on the retrieve context. Conventional chunking methods generate limited metadata about the chunks. Further, the conventional chunking methods interlink chunks inefficiently. Due to inefficient chunking and lack of metadata about the chunks, the RAG system often retrieves partially or entirely irrelevant context for user-queries. As the chunks are not augmented before storing, the RAG system generates a poor response. Moreover, the conventional chunking methods consider only the structure of the content and not the semantics. Specifically, the conventional chunking methods consider only the size of the chunks or the number of tokens/characters of each chunk and splitting characters and keywords. As a result, the generated chunks may not provide useful information for a response to the user query. However, different documents have different semantics, syntax or structure, and thus an improved chunk evaluation strategy is required.

In view of this, in the present disclosure, a method and a system for augmentation of context for retrieval augmented generation (RAG) based on a large language model (LLM), to overcome above mentioned drawbacks of conventional methods of context augmentation, are described. In the present disclosure the chunks are augmented by generating appropriate metadata about the chunks before storing the chunks in a database or indexing the chunks.

In an example, a policy of the RAG system and a vocabulary to capture the scope and objective of the RAG systems are described. The disclosed policy of the RAG system drives the query generation process to reflect the captured scope and objective of a specific RAG system. As a result, the generated queries for each chunk of a plurality of chunks representing the total context include the scope and objective of the RAG system and align with the objective of the RAG system. The generated queries are then included within the related chunks as metadata for efficient retrieval. Additionally, multiple chunks are interlinked by generating a vocabulary for the question generator and devising a policy for generating the vocabulary. Moreover, the generated queries are evaluated, thereby enabling the alignment of the queries with their respective associated chunks according to the policy of the RAG system.

Figure 1:
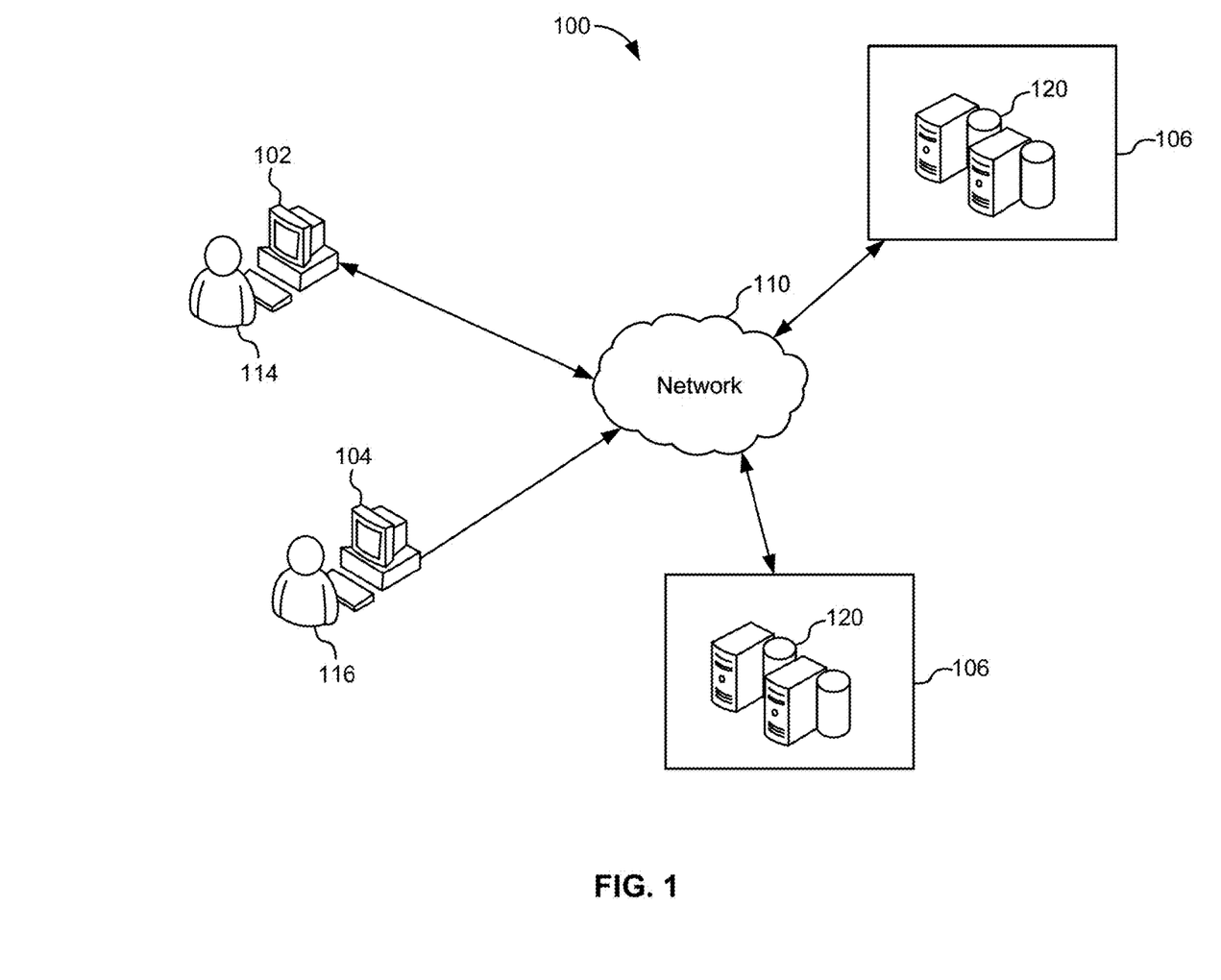
FIG. 1 illustrates an example environment that may be used to execute implementations of the present disclosure.

FIG. 1 depicts an example environment 100 that can be used to execute implementations of the present disclosure. In some examples, the example environment 100 enables users associated with respective systems to execute requests to generate content by invoking a trained language model in accordance with implementations of the present disclosure. The example environment 100 includes computing devices 102 and 104, back-end systems 106, and a network 110. In some examples, the computing devices 102 and 104 are used by respective users 114 and 116 to log into and interact with the back-end systems 106 and applications executing on the back-end systems 106 according to implementations of the present disclosure.

As shown in FIG. 1, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites (e.g., web applications executing on back-end systems 106), user devices (e.g., computing devices 102, 104), and back-end systems 106. In some examples, the network 110 can be accessed over a wired and/or a wireless communications link. For example, mobile computing devices, such as smartphones can utilize a cellular network to access the network 110.

Each of the back-end systems 106 includes at least one server system 120. In some examples, the at least one server system 120 hosts one or more computer implemented services that users can interact with by using computing devices 102 and/or 104. For example, components of enterprise systems and applications can be hosted on one or more of the back-end systems 106. In some examples, the back-end system 106 can be provided as an on-premises system that is operated by an enterprise or a third-party taking part in cross-platform interactions and data management. In some examples, the back-end system 106 can be provided as an off-premises system (e.g., cloud or on-demand) that is operated by an enterprise or a third-party on behalf of an enterprise.

In some examples, the computing devices 102 and 104 each include computer executable applications executed thereon. In some examples, the computing devices 102 and 104 each include a web browser application executed thereon, which can be used to display one or more web pages of applications executing on the back-end system 106. In some examples, each of the computing devices 102 and 104 can display one or more GUIs that enable the respective users 114 and 116 to interact with the back-end system 106. In accordance with implementations of the present disclosure, the back-end system 106 may host enterprise applications or systems that require data sharing and data privacy. In some examples, the computing device 102 and/or the computing device 104 can communicate with the back-end systems 106 over the network 110.

In some implementations, at least one of the back-end systems 106 can be implemented in a cloud environment. The back-end systems 106 includes at least one server system (or server) 120. In the example of FIG. 1, the back-end system 106 can include various forms of servers including, but not limited to, a web server, an application server, a proxy server, a network server, and/or a server pool. In general, server systems accept requests for application services and provide such services to any number of client devices (for example, the computing device 102 over the network 110).

In some implementations, the back-end system 106 can be used to implement an Artificial Intelligence (AI)-enabled platform trained to generate content relevant for an individual's query in accordance with contextual information and training data indicative of reactions of similar consenting individuals to certain content items (e.g., neuroscience responses). The AI-enabled platform can include a trained generative AI model that generates such personalized content.

Various examples, depicting context augmentation, are described in detail in conjunctions with figures below.

Figure 2:
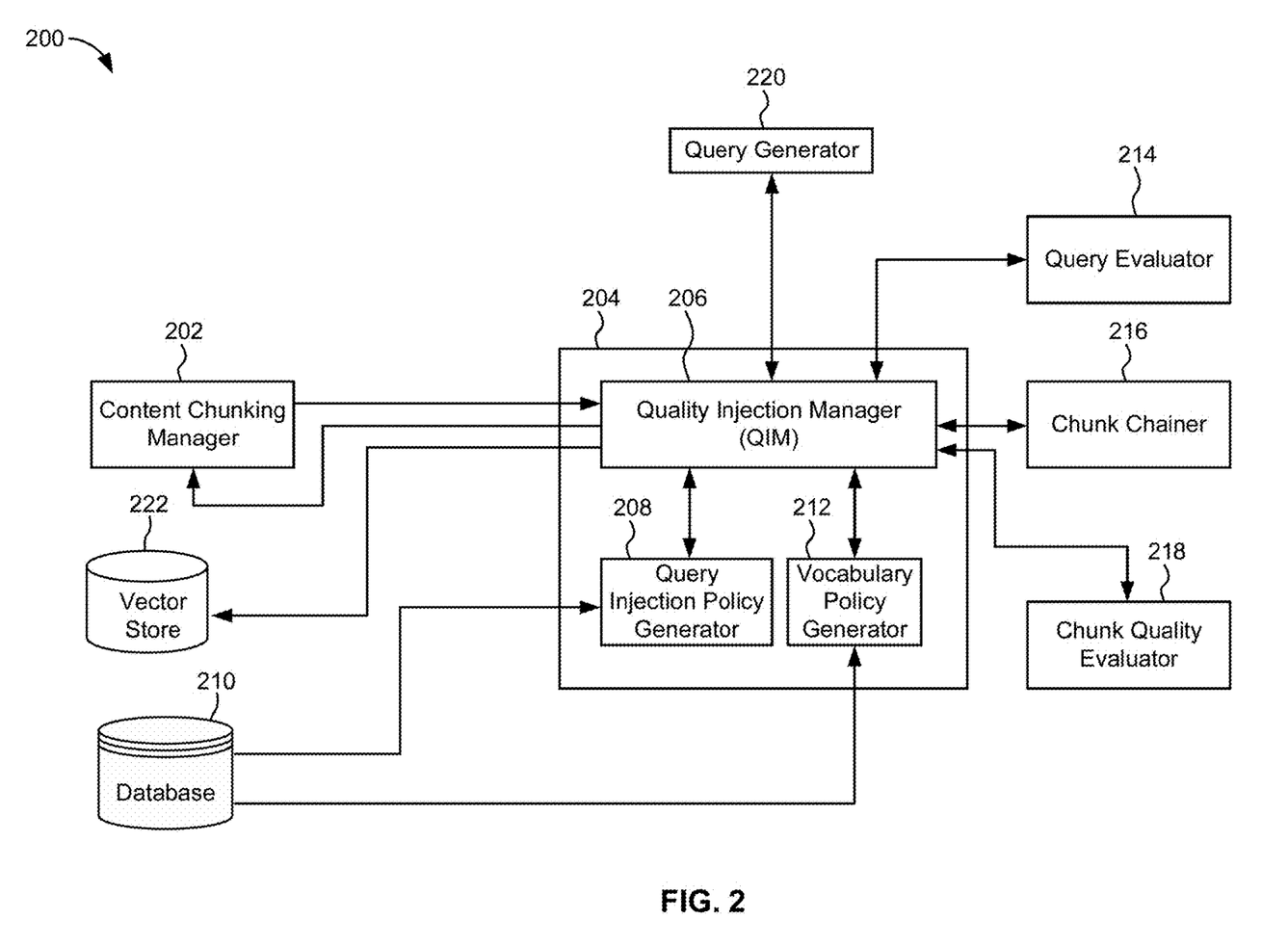
FIG. 2 illustrates an example block diagram representation of a high-level architecture implementing context augmentation, in accordance with implementations of the present disclosure.

FIG. 2 illustrates a block diagram representation of a high-level architecture of system 200 implementing context augmentation, in accordance with implementations of the present disclosure. The high-level architecture of system 200 may include a content chunking manager 202, a query injection manager (QIM) 206, a query injection policy generator 208, a vocabulary policy generator 212, a query generator 220, a query evaluator 214, a chunk chainer 216, a chunk quality evaluator 218, a vector store 222 and a database 210.

The content chunking manager 202 may be provided to divide the relevant knowledge base or documents into smaller segments or chunks. The process of dividing may be referred to as chunking. Chunking is essential for efficient retrieval and processing of information. Chunking breaks down large documents into smaller, more manageable units. The chunks can be of varying sizes, depending on the specific implementation of the RAG system. Specifically, the content chunking manager 202 may divide the documents into plurality of chunks, by using a policy of a retrieval augmented generation (RAG) system. Herein, the plurality of chunks may represent a context of the RAG system. The QIM 206 may receive the plurality of chunks from the content chunking manager 202.

The QIM 206 may communicate with the query injection policy generator 208 and the vocabulary policy generator 212 to capture the policy of the RAG system. Specifically, the query injection policy generator 208 may retrieve the RAG system specification from the database 210 to generate the policy of the RAG system. The policy of the RAG system may include the scope and objective of the specific RAG system. The policy of the RAG system may refer to a set of guidelines that define the specific parameters and configurations for the RAG system's operation.

The policy of the RAG system may include details of the RAG system corresponding to, but not limited to, a question-and-answer type, a user type, a list of topics, and/or a chunking and indexing strategy of the RAG system. The question-and-answer type details may include the types of questions for which the RAG system is designed to handle, such as factual, open-ended, or hypothetical questions. Moreover, question-and-answer type details may also provide the expected format of the answers, including whether the answers required are to be concise, comprehensive, or in a specific style. The user type details may define the target user groups for the RAG system, for example, researchers, students, and/or general consumers. The user type details may also specify the level of expertise or knowledge required for users to effectively interact with the system. The policy of the RAG system may further provide the range of topics that the RAG system is capable of addressing. By way of an example, the policy of the RAG system may include specifying the depth of knowledge and the granularity of the information that the RAG system can provide on each topic. The chunking and indexing strategy of the RAG system may include information about how the RAG system processes and stores information. Moreover, the said chunking and indexing strategy may include information, such as, how large pieces of text are broken down into smaller units for indexing. Additionally, the said chunking and indexing strategy may also include information specifying the indexing strategy, which determines how these smaller units are organized and stored for efficient retrieval.

Furthermore, the vocabulary policy generator 212 may retrieve the RAG system specification from the database 210 to generate a domain-specific policy. Herein, the domain-specific policy may refer to the guidelines and criteria for generating a vocabulary by the chunk chainer 216. The vocabulary may be generated according to the domain-specific policy and/or the policy specific to the RAG system. The domain-specific policy may consider the types of questions that the RAG system is designed to handle, ensuring that the vocabulary includes terms that are relevant to those query intents. In other words, the domain specific policy may include terms and phrases that are relevant to a specific domain, thereby ensuring that the generated responses are focused to the specific domain and informative corresponding to the specific domain. In essence, the policy of the RAG system and the domain specific policy may ensure that the system operates in a consistent and predictable manner, providing users with the expected level of performance and accuracy in response generation.

Furthermore, the QIM 206 may transmit the chunks, policy of the RAG system and the domain-specific policy to the chunk chainer 216 to generate the vocabulary from the words of the targeted chunks. Specifically, the chunk chainer 216 may identify one or more other chunks from the plurality of chunks that are related to the chunk of the plurality of chunks. Herein, the chunk chainer 216 may identify the one or more other related chunks based on at a list of keywords selected from data of the chunk and the chunk.

The QIM 206 may transmit the policy of the RAG system and the vocabulary, from the query injection policy generator 208 and the vocabulary policy generator 212, respectively, to the query generator 220. The query generator 220 may generate a first set of queries based on the policy of the RAG system and the vocabulary for augmenting the chunks through query injection. The first set of queries may correspond with a first chunk of the plurality of chunks. Herein, the query injection may refer to the process of introducing additional keywords or phrases into the generated first set of queries to enhance their relevance and informativeness. Specifically, generating the first set of queries may include generating one or more queries using, but not limited to, a large language model (LLM), a question knowledgebase, and/or human-generated queries. Moreover, generating the first set of queries may further include determining one or more of a number of queries to be generated for the chunk, a query-type for each query to be generated, a length of each query to be generated, and/or one or more keywords for each query to be generated.

In further detail, the query generator 220 may generate in accordance with the policy of the RAG system, a second set of queries for the chunk and the other chunk of the plurality of chunks. Specifically, the chunk chainer 216 may first creates a policy to generate the vocabulary. Herein, the policy may define parameters, for example, the maximum size of the vocabulary, types of words, word-selection process. For generating the vocabulary, the chunk-chainer 216, may first, select important words from the targeted chunks according to the policy of the RAG system and the domain-specific policy. Thereafter, the chunk chainer 216 may process the vocabulary. The processing may include, but not limited to, selecting only a fixed number of the words, stemming the words and removing the stop-words. After the vocabulary is created, the chunk chainer 216 may returns the vocabulary to the QIM 206 to generate the second set of queries, via the query generator 220. The vocabulary transmitted or sent to the QIM 206 corresponds with the chunk and another chunk of the plurality of chunks.

Moreover, the query evaluator 214 may determine, based upon the set of quality indicators, a quality class of each query of the second set of queries. Based upon the determined quality class of each query of the second set of queries, the chunk chainer 216 may update the chunk to further include data of the other chunk and query data of one or more queries of the second set of queries. In other words, the other chunk is determined to be associated with or related to the chunk based upon the determined quality class of each query of the second set of queries.

In further detail, for each chunk of the plurality of chunks, the chunk chainer 216 may estimate a count of queries of the first set of queries that satisfies a condition corresponding to the quality class. Moreover, the chunk chainer 216 may determine a count of chunks of the plurality of chunks having one or more query that satisfies the condition corresponding to the quality class. Consequently, the chunk chainer 216 may regenerate the plurality of chunks representing the context of the RAG system in accordance with the count of chunks that satisfies the condition corresponding to the quality class above a threshold value.

Further, the QIM 206 may send the first set of queries to the query evaluator 214. Specifically, the query evaluator 214 may determine a quality class of each query of the first set of queries based upon a set of quality indicators. Herein, the quality indicators may refer to metrics that measure the effectiveness of the queries in terms of their relevance, specificity, and coherence. For instance, the quality indicators may include factors such as query length, keyword relevance and semantic coherence. The query length may determine the quality, as shorter queries may be more focused and easier to understand. The keyword relevance in the target domain may be assessed, thereby ensuring that the query is aligned with the intended topic. The semantic coherence of the query may define how appropriate the words and phrases in the query fit together and convey a clear meaning. Furthermore, the query evaluator 214 may evaluate the alignment of the first set of queries and the chunks according to the policy of the RAG system. This may include comparing the keywords and phrases in the queries to the terms and concepts present in the chunks. The query evaluator 214 may utilize techniques such as semantic similarity analysis or keyword matching to determine the degree of alignment between the queries and the chunks The query evaluator 214 may classify the first set of queries as high, moderate, and low-quality queries according to the evaluation. The high-quality queries may refer to the queries that are semantically relevant and aligns with the given context. The high-quality queries may directly relate to the topic or subject matter of interest and may adhere to the specific syntax. The moderate quality queries may lack precision with respect to the given context, with some potential of information retrieval. The moderate quality queries may be expected to retrieve relevant information but may also return irrelevant results. The low-quality queries may be weakly relevant or irrelevant to the context and are unlikely to retrieve relevant information. Low quality queries may contain irrelevant keywords or may be poorly phrased. In essence, by classifying the queries based on their quality, the queries can be prioritized for further processing and ensured that the most promising queries are utilized to augment the chunks. This can help to improve the efficiency and accuracy of the RAG system's responses.

Thereafter, the chunk quality evaluator 218 may receive the plurality of chunks, the first set of queries and the second set of queries, from the QIM 206, to evaluate the quality of chunk. Further, the chunk quality evaluator 218 may provide feedback to QIM 206 related to the chunk quality. Herein, the feedback quality may be high, moderate and low. Specifically, the chunk quality evaluator 218 may determine the total number of high-quality queries of the first set of queries from each of the chunks. Thereafter, the chunk quality evaluator 218 may determine the number of chunks consumed/required to generate high quality queries the first set of queries. The chunk quality evaluator 218 may evaluate the quality of the policy of the RAG system for a given set of documents based on the determined total number of queries with high quality and the total number of chunks consumed/required to generate the high-quality queries. In an example, if the number chunks with high quality queries exceeds 80 percent of total chunks, then the chunk quality evaluator 218 may classify the policy of the RAG system as high quality. In another example, if the number chunks with high quality queries is within the range of 60-80% of total chunks, then the chunk quality evaluator 218 may classify the policy of the RAG system as moderate quality. Similarly, in another example, the policy of the RAG system may be classified as low quality, if the if the number of chunks with high quality queries is less than 80 percent of total chunks.

Furthermore, the QIM 206 may receive the information of chunk quality, evaluated by the chunk quality evaluator 218. The QIM 206 may update the chunk to an updated chunk. Specifically, the QIM 206 may include the query data of one or more queries of the first set of queries to the chunk and thereby updating the chunk. Moreover, the QIM 206 may update the chunk based upon the quality class of each query of the first set of queries. The updated chunks may be stored in the vector store 222 as a vector for retrieval from the RAG system upon receiving a prompt. Specifically, the QIM 206 may store the updated chunks in the vector store 222 for further processing and may, further, send the feedback related to the chunk quality to other stakeholders.

Figure 3:
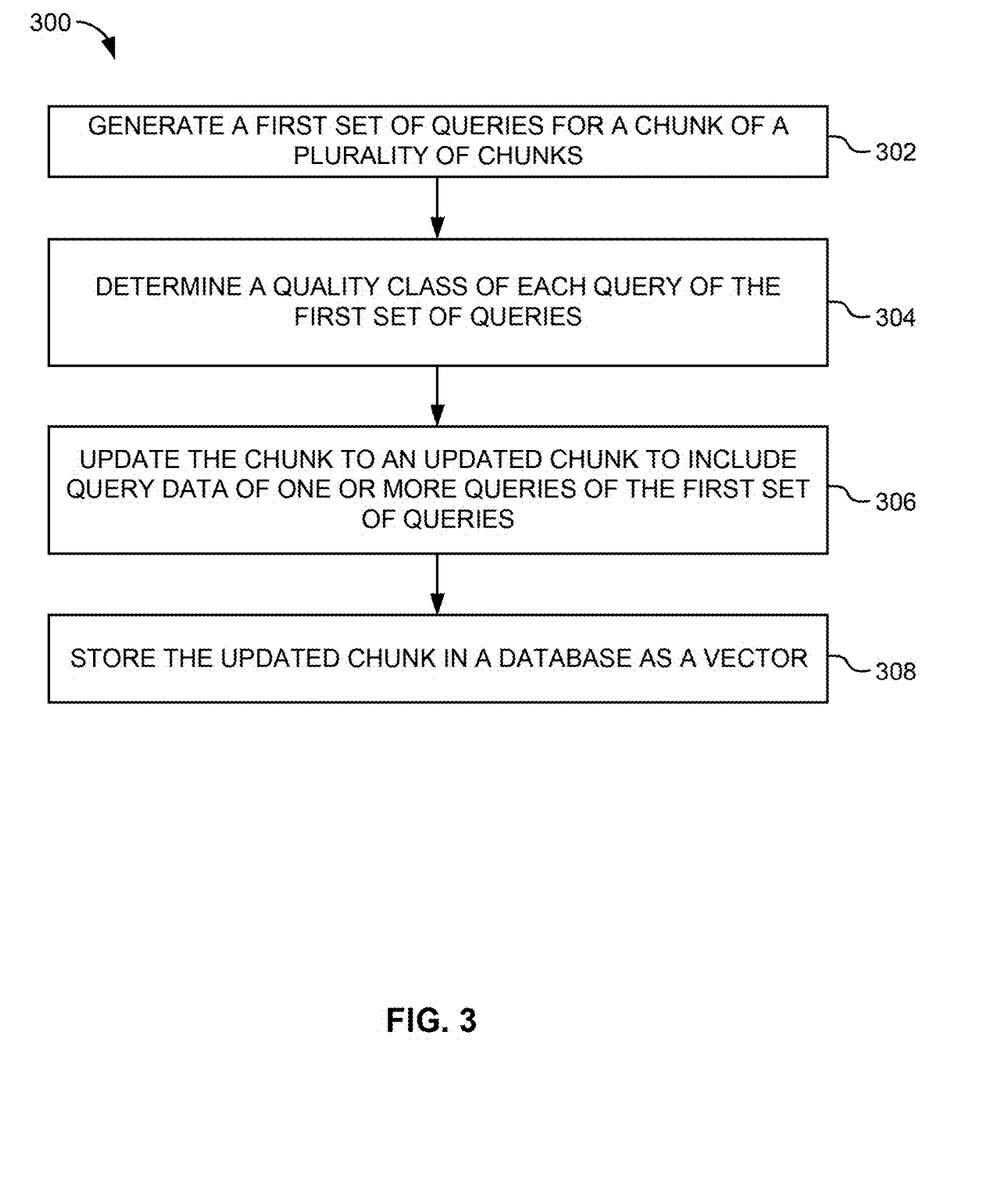
FIG. 3 illustrates a flow diagram of an example method operations for context augmentation, in accordance with implementations of the present disclosure.

FIG. 3 illustrates the flow diagram of an example method 300 for context augmentation, in accordance with implementations of the present disclosure, as described in conjunction with FIG. 2, herein.

The method 300 may include generating 302, a first set of queries for a chunk of a plurality of chunks. Herein, the plurality of chunks may represent a context of the RAG system. Specifically, the query generator 220 may generate the first set of queries, in accordance with a policy of a RAG system.

The method 300 may include determining 304 a quality class of each query of the first set of queries, based upon a set of quality indicators. Specifically, the query evaluator 214 may classify the first set of queries as high, moderate, and low-quality queries according to the evaluation.

The method 300 may include updating 306, the chunk to an updated chunk to further include query data of one or more queries of the first set of queries based upon the quality class of each query of the first set of queries.

The method 300 may include storing 308, the updated chunk in a database as a vector for retrieval from the RAG system upon receiving a prompt.

Figure 4:
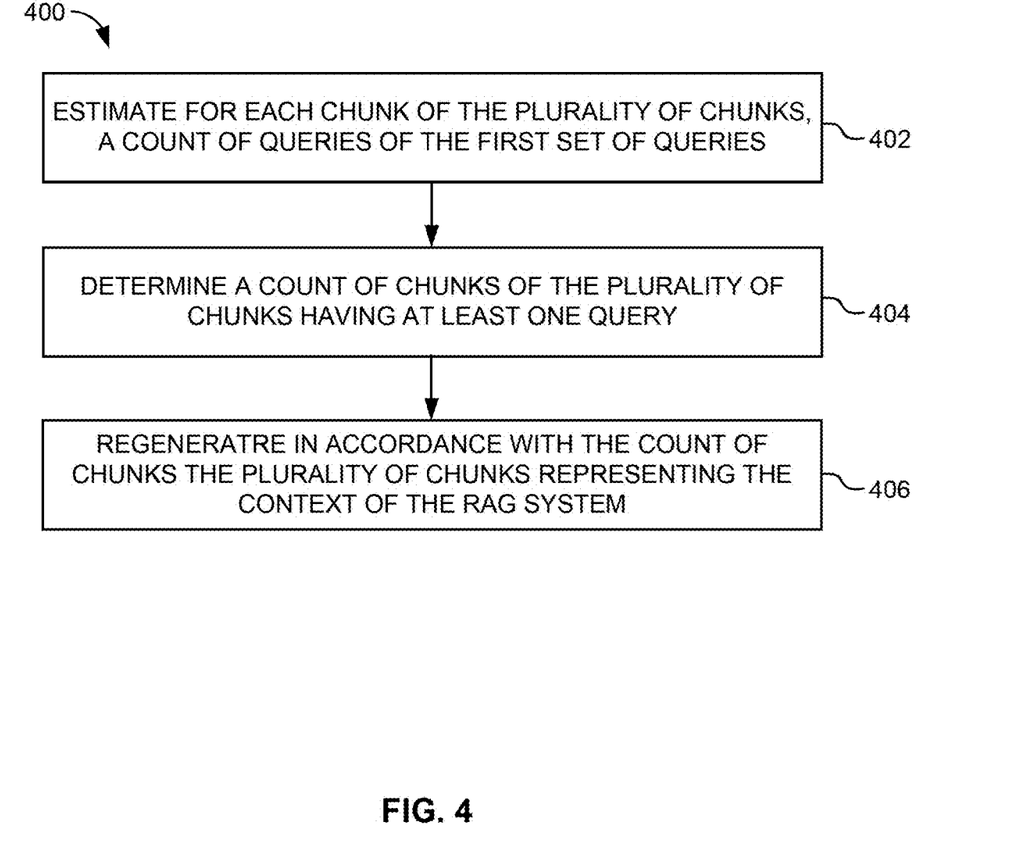
FIG. 4 illustrates the flow diagram of an example method operations for chaining multiple chunks, in accordance with implementations of the present disclosure.

FIG. 4 illustrates the flow diagram of an example method 400 implemented by chunk chainer 216, in accordance with implementations of the present disclosure, as described in conjunction with FIG. 2, herein.

The method 400 may include estimating 402, for each chunk of the plurality of chunks, a count of queries of the first set of queries that satisfies a condition corresponding to the quality class. Specifically, each chunk may be processed and number of queries of the first set of queries may be determined that satisfy the quality criteria for that specific chunk. This may include comparing each query of the first set of queries to the content of the chunk and assessing its relevance and alignment. Thus, distribution of high-quality queries across the plurality of chunks may be determined.

The method 400 may include determining 404, a count of chunks of the plurality of chunks having the query that satisfies the condition corresponding to the quality class. The count of chunks may indicate the proportion of the plurality of chunks that is covered by the generated first set of queries. A high count of chunks with high-quality queries may indicate that the query generation process is effective in producing relevant and informative queries.

The method 400 may include regenerating, by the one or more processors, in accordance with the count of chunks that satisfies the condition corresponding to the quality class below a threshold value, the plurality of chunks representing the context of the RAG system. For instance, if the chunk has a low number of high-quality queries associated with it, it may be considered less relevant to the overall context of the RAG system. Therefore, the plurality of chunks representing the context of the RAG system may be regenerated to exclude or down weight the less relevant chunks.

Implementations of the present disclosure provides technical solutions to multiple technical problems that arise in the context of generating responses using large language model (LLM) based retrieval augmented generation (RAG). For example, in the present disclosure queries may be generated by the query generator 220 according to the policy of the RAG system and domain-specific vocabulary (generated by Query Injection Policy Generator 208 and Vocabulary Policy Generator 212 respectively). The chunks may be updated with the said generated queries, which act as a form of metadata of the chunks, thereby facilitating better retrieval process.

Furthermore, query evaluator may evaluate the quality of queries and the alignment of the queries with their respective associated chunks according to the policy of the RAG system and domain-specific vocabulary. Moreover, in the present disclosure, the chunk quality evaluator 218 may evaluate the quality of the chunking strategy for a given set of documents based on the total number of queries with high quality and the total number of chunks which provide high quality queries.

In the present disclosure, the chunk chainer 216 may interlink multiple chunks together. A specific chunk is chained with other chunks by generating queries with appropriately selected vocabulary from the targeted chunks and injected the queries within the chunk under consideration.

In essence, the implementations of the present disclosure may enhance the quality of generated responses by strategically incorporating relevant queries into the context or smaller segments of information. By combining query generation, query injection, and chunking, the system 200 may ensures that the outputs are more informative, accurate, and aligned with the specific context of the user's request/questions.

In an example, a question-and-answer LLM-based RAG system for Financial Data Regulatory Information Management System (FDRIM), is to be developed, which will provide short answers to the questions from novice users. To answer the end-user questions, the RAG system needs to store open-sourced non-confidential data and some selective sensitive internal documents. The content chunking manager 202 may receive the input content and divide it into a plurality of chunks or smaller segments. For instance, the content chunking manager 202 may create chunks with size 600 tokens and no overlap between chunks. For example, chunk may be as follows:

Chunk 1: "Today's risks are complex and interconnected, with new risks emerging rapidly. Volatility is increasing, along with regulatory pressure. We have seen major disruptions to business cycles over the last three decades, including the dot-com crash, the global financial crisis and the recent Covid-19 pandemic. Volatility seems likely to increase, along with threats from known and unknown places. Regulation is unlikely to become less complex or less demanding. In this environment, every organization needs to improve its risk management capabilities."

Chunk 2: "We work with Chief Finance Officers, Chief Risk Officers and other senior risk and compliance executives to help them manage their risk agenda across five key areas: Cyber Risk, Operational Risk & Resilience, Fraud & Financial Crime, Regulatory & Compliance and Financial Risk."

Thereafter, the QIM 206 may communicate with the query injection policy generator 208 and vocabulary policy generator 212 to determine the policy of the RAG system and domain specific policy. In an example, the policy of the RAG system and domain specific policy may be as follows:

Number of queries per chunk: one

Length of each query: seven-to-ten words

Query generator for non-confidential data: any available Large Language Model (LLM) Available LLM: GPT 4

Query generator for confidential data: selected human-annotators

Selected topic-list:
Financial Data Regulation
Financial Risk Management

Key word selection:
Selecting "nouns" where count (i-th noun word)<=2 from immediate adjacent chunks Further, the query generator 220 may generate the first set of queries for a chunk of the plurality of chunks. For example, the query generator 220 may generate the query "what is driving the need for enhanced financial risk management?" based on the policy of the RAG system. Thereafter, the chunk 1 may be updated, by including the generated query, as:

"Today's risks are complex and interconnected, with new risks emerging rapidly. Volatility is increasing, along with regulatory pressure. We have seen major disruptions to business cycles over the last three decades, including the dotcom crash, the global financial crisis and the recent Covid-19 pandemic. Volatility seems likely to increase, along with threats from known and unknown places. Regulation is unlikely to become less complex or less demanding. In this environment, every organization needs to improve its risk management capabilities.

what is driving the need for enhanced financial risk management?"

The queries may act as metadata of their respective chunks and thus may facilitate the retrieval process to fetch appropriate chunks based on a given context.

Thereafter, the queries may be evaluated by the query evaluator 214 to determine the quality class of each query of the first set of queries. For example, below given is the chunk 1:

"Today's risks are complex and interconnected, with new risks emerging rapidly. Volatility is increasing, along with regulatory pressure. We have seen major disruptions to business cycles over the last three decades, including the dotcom crash, the global financial crisis and the recent Covid-19 pandemic. Volatility seems likely to increase, along with threats from known and unknown places. Regulation is unlikely to become less complex or less demanding. In this environment, every organization needs to improve its risk management capabilities.".

The query generator 220 may generate the first set of queries as below:

Query 1: "what is driving the need for enhanced financial risk management?"

Query 2: "what is driving the need for enhanced risk management?"

Thereafter, the query evaluator 214 may determine the quality class (high, moderate, and low-quality queries) of each query of the first set of queries. For example, alignment of query 1 with the chunk 1 is high, therefore the query 1 will be classified as "high quality". Similarly, the alignment of the query 2 is with the chunk is low, therefore the query 2 will be classified as "low quality".

Furthermore, for the below generated chunks, generated vocabulary for chaining can be "volatility":

Chunk 1: "Today's risks are complex and interconnected, with new risks emerging rapidly. Volatility is increasing, along with regulatory pressure. We have seen major disruptions to business cycles over the last three decades, including the dot-com crash, the global financial crisis and the recent Covid-19 pandemic. Volatility seems likely to increase, along with threats from known and unknown places. Regulation is unlikely to become less complex or less demanding. In this environment, every organization needs to improve its risk management capabilities."

Chunk 2: "We work with Chief Finance Officers, Chief Risk Officers and other senior risk and compliance executives to help them manage their risk agenda across five key areas: Cyber Risk, Operational Risk & Resilience, Fraud & Financial Crime, Regulatory & Compliance and Financial Risk."

In case the targeted chunk is "chunk 2" and the query of the second set of queries generated by the query generator 220 is "How does an executive manage different risks within volatility?", the augmented chunk may be as below:

"We work with Chief Finance Officers, Chief Risk Officers and other senior risk and compliance executives to help them manage their risk agenda across five key areas: Cyber Risk, Operational Risk & Resilience, Fraud & Financial Crime, Regulatory & Compliance and Financial Risk.

How does an executive manage different risks within volatility?"

Figure 5:
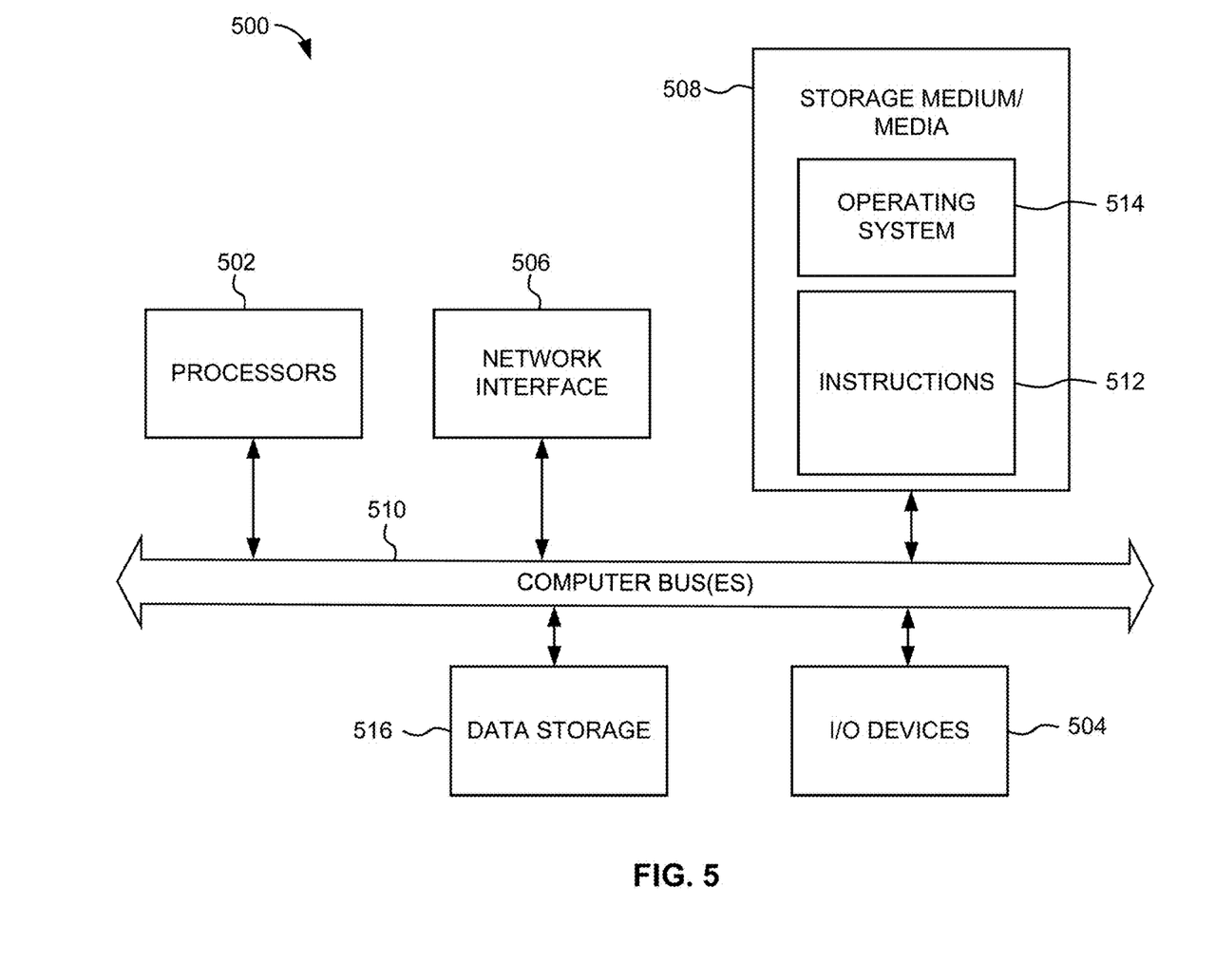
FIG. 5 illustrates an example computer system that may be used to implement the system for context augmentation, in accordance with implementations of the present disclosure.

FIG. 5 illustrates a computer system 500 that may be used to implement the system for context augmentation. More particularly, computing machines such as desktops, laptops, smartphones, tablets, and wearables which may be used to implement the tasks that may have the structure of the computer system 500. The computer system 500 may include additional components not shown and that some of the process components described may be removed and/or modified. In another example, a computer system 500 may be deployed on external-cloud platforms such as cloud, internal corporate cloud computing clusters, organizational computing resources, and/or the like.

The computer system 500 includes processor(s) 502, such as a central processing unit, ASIC or another type of processing circuit, input/output devices 504, such as a display, mouse keyboard, etc., a network interface 506, such as a Local Area Network (LAN), a wireless 802.11x LAN, a 3G or 4G mobile WAN or a WiMax WAN, and a computer-readable medium 508. Each of these components may be operatively coupled to a bus 510. The computer-readable medium 508 may be any suitable medium that participates in providing instructions to the processor(s) 502 for execution. For example, the computer-readable medium 508 may be non-transitory or non-volatile medium, such as a magnetic disk or solid-state non-volatile memory or volatile medium such as RAM. The instructions or modules stored on the computer-readable medium 508 may include machine-readable instructions 512 executed by the processor(s) 502 that cause the processor(s) 502 to perform the methods and functions of the system for context augmentation.

The system may be implemented as software stored on a non-transitory processor-readable medium and executed by the processors 502. For example, the computer-readable medium 508 may store an operating system 514, such as MAC OS, MS WINDOWS, UNIX, or LINUX, and code for the system. The operating system 514 may be multi-user, multiprocessing, multitasking, multithreading, real-time, and the like. For example, during runtime, the operating system 514 is running and the code for the system is executed by the processor(s) 502.

The computer system 500 may include a data storage 516, which may include non-volatile data storage. The data storage 516 stores any data used or generated by the system.

The network interface 506 connects the computer system 500 to internal systems for example, via a LAN. Also, the network interface 506 may connect the computer system 500 to the Internet. For example, the computer system 500 may connect to web browsers and other external applications and systems via the network interface 506.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations.

Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for improving accuracy of retrieval augmented generation (RAG), the method comprising:
    generating, by one or more processors, in accordance with a policy of a RAG system, a first set of queries for a chunk of a plurality of chunks, the plurality of chunks represents a context of the RAG system;
    determining, by the one or more processors and based upon a set of quality indicators, a quality class of each query of the first set of queries;
    updating, by the one or more processors, the chunk to an updated chunk to further include query data of one or more queries of the first set of queries based upon the quality class of the each query of the first set of queries;
    storing, by the one or more processors, the updated chunk in a database as a vector for retrieval from the RAG system upon receiving a prompt;
    estimating, by the one or more processors, for each chunk of the plurality of chunks, a count of queries of the first set of queries that satisfies a condition corresponding to the quality class;
    determining, by the one or more processors, a count of chunks of the plurality of chunks having at least one query that satisfies the condition corresponding to the quality class; and
    regenerating, by the one or more processors, in accordance with the count of chunks that satisfies the condition corresponding to the quality class below a threshold value, the plurality of chunks representing the context of the RAG system.

2. The computer-implemented method of claim 1, wherein the policy of the RAG system includes details of the RAG system corresponding to at least one of a question-and-answer type, a user type, a list of topics, and/or a chunking and indexing strategy of the RAG system.

3. The computer-implemented method of claim 1, wherein generating the first set of queries comprises generating one or more queries using at least one of a large language model, a question knowledgebase, and/or human-generated queries.

4. The computer-implemented method of claim 3, wherein generating the first set of queries further comprises determining one or more of a number of queries to be generated for the chunk, a query-type for each query to be generated, a length of each query to be generated, and/or one or more keywords for each query to be generated.

5. The computer-implemented method of claim 4, wherein the one or more keywords are selected from a vocabulary that is generated according to at least one of a domain-specific policy and/or a policy specific to the RAG system.

6. The computer-implemented method of claim 1, further comprising:
    identifying, by the one or more processors, at least one other chunk of the plurality of chunks that is related to the chunk of the plurality of chunks;
    generating, by the one or more processors, in accordance with the policy of the RAG system, a second set of queries for the chunk and at least one other chunk of the plurality of chunks;
    determining, by the one or more processors, based upon the set of quality indicators, a quality class of each query of the second set of queries; and
    updating, by the one or more processors, the chunk to further include data of the at least one other chunk and query data of one or more queries of the second set of queries based upon the determined quality class of each query of the second set of queries.

7. The computer-implemented method of claim 6, further comprising identifying, based on at least in part upon a list of keywords selected from data of the chunk and the at least one other chunk, the at least one other chunk of the plurality of chunks.

8. A system for improving accuracy of retrieval augmented generation (RAG) comprising:
    at least one memory configured to store instructions; and
    at least one processor communicatively coupled with the at least one memory and configured to execute the stored instructions to perform operations comprising:
    generating, in accordance with a policy of a RAG system, a first set of queries for a chunk of a plurality of chunks, wherein the plurality of chunks represents a context of the RAG system;
    determining a quality class of each query of the first set of queries, wherein the quality class of the each query is determined based upon a set of quality indicators;
    updating the chunk to an updated chunk to further include query data of one or more queries of the first set of queries based upon the quality class of the each query of the first set of queries; and storing the updated chunk in a database as a vector for retrieval from the RAG system upon receiving a prompt;
    estimating, for each chunk of the plurality of chunks, a count of queries of the first set of queries that satisfies a condition corresponding to the quality class;
    determining a count of chunks of the plurality of chunks having at least one query that satisfies the condition corresponding to the quality class; and
    regenerating, in accordance with the count of chunks that satisfies the condition corresponding to the quality class below a threshold value, the plurality of chunks representing the context of the RAG system.

9. The system of claim 8, wherein the policy of the RAG system includes details of the RAG system corresponding to at least one of a question-and-answer type, a user type, a list of topics, and/or a chunking and indexing strategy of the RAG system.

10. The system of claim 8, wherein generating the first set of queries comprises generating one or more queries using at least one of a large language model, a question knowledgebase, and/or human-generated queries.

11. The system of claim 10, wherein generating the first set of queries further comprises determining one or more of a number of queries to be generated for the chunk, a query-type for each query to be generated, a length of each query to be generated, and/or one or more keywords for each query to be generated.

12. The system of claim 11, wherein the one or more keywords are selected from a vocabulary that is generated according to at least one of a domain-specific policy and/or a policy specific to the RAG system.

13. The system of claim 8, wherein the operations further comprise:
    identifying at least one other chunk of the plurality of chunks that is related to the chunk of the plurality of chunks;
    generating, in accordance with the policy of the RAG system, a second set of queries for the chunk and at least one other chunk of the plurality of chunks;
    determining a quality class of each query of the second set of queries, wherein the quality class of each query of the second set of queries is determined based upon the set of quality indicators; and
    updating the chunk to further include data of the at least one other chunk and query data of one or more queries of the second set of queries based upon the determined quality class of each query of the second set of queries.

14. The system of claim 13, wherein the at least one other chunk of the plurality of chunks is identified based at least in part upon a list of keywords selected from data of the chunk and the at least one other chunk.

15. A non-transitory computer-readable media (CRM) comprising instructions, which are executable by at least one processor of a computing device configured to improve accuracy of retrieval augmented generation (RAG), wherein the instructions when executed by the at least one processor cause the computing device to:
    generate, in accordance with a policy of a RAG system, a first set of queries for a chunk of a plurality of chunks, wherein the plurality of chunks represents a context of the RAG system;
    determine a quality class of each query of the first set of queries, wherein the quality class of the each query is determined based upon a set of quality indicators;
    update the chunk to an updated chunk to further include query data of one or more queries of the first set of queries based upon the quality class of the each query of the first set of queries; and store the updated chunk in a database as a vector for retrieval from the RAG system upon receiving a prompt;
    estimate, for each chunk of the plurality of chunks, a count of queries of the first set of queries that satisfies a condition corresponding to the quality class;
    determine a count of chunks of the plurality of chunks having at least one query that satisfies the condition corresponding to the quality class; and
    regenerate, in accordance with the count of chunks that satisfies the condition corresponding to the quality class below a threshold value, the plurality of chunks representing the context of the RAG system.

16. The non-transitory CRM of claim 15, wherein the policy of the RAG system includes details of the RAG system corresponding to at least one of a question-and-answer type, a user type, a list of topics, and/or a chunking and indexing strategy of the RAG system.

17. The non-transitory CRM of claim 15, wherein to generate the first set of queries comprises:
    generating one or more queries using at least one of a large language model, a question knowledgebase, and/or human-generated queries; and
    determining one or more of a number of queries to be generated for the chunk, a query-type for each query to be generated, a length of each query to be generated, and/or one or more keywords for each query to be generated, wherein the one or more keywords are selected from a vocabulary that is generated according to at least one of a domain-specific policy and/or a policy specific to the RAG system.

* * * * *